United States Patent [19]

Hendrix

[11] 3,925,576
[45] Dec. 9, 1975

[54] BITUMINOUS COATING SYSTEM AND ARTICLES PRODUCED THEREBY

[75] Inventor: Palmer G. Hendrix, Hickory, N.C.

[73] Assignee: The Hill and Griffith Company, Cincinnati, Ohio

[22] Filed: Aug. 3, 1973

[21] Appl. No.: 385,284

Related U.S. Application Data

[62] Division of Ser. No. 323,443, Jan. 15, 1973.

[52] U.S. Cl. ............ 427/230; 260/28.5 AS; 260/23; 427/234; 427/372; 427/388; 427/417; 427/443
[51] Int. Cl.² .................................... B05D 7/22
[58] Field of Search ........ 117/30, 92, 135, 168, 94, 117/95, 97; 260/28.5 AS

[56] References Cited
UNITED STATES PATENTS

| | | | |
|---|---|---|---|
| 2,365,427 | 12/1944 | Moore | 117/135 |
| 2,656,857 | 10/1953 | Cavallier | 117/168 |
| 2,727,832 | 12/1955 | Christensen et al. | 117/92 |
| 3,024,130 | 3/1962 | Kish | 117/94 |
| 3,039,495 | 6/1962 | Drukker | 117/92 |
| 3,247,011 | 4/1966 | Higgins | 117/30 |
| 3,252,822 | 5/1966 | Burns | 117/92 |
| 3,514,312 | 5/1970 | Gardiner | 117/64 R |
| 3,778,397 | 12/1973 | Gannon et al. | 260/28.5 AS |
| 3,785,852 | 1/1974 | Schleidt | 260/28.5 AS |
| 3,790,519 | 2/1974 | Wahlborg | 260/28.5 AS |

*Primary Examiner*—William R. Trenor
*Attorney, Agent, or Firm*—John G. Schenk

[57] ABSTRACT

A water based bituminous composition is provided for improved coating of metal articles exemplified by cast iron water pipe, comprising from about 25 to about 65 weight per cent bituminous constituent, from about 0.5 to about 3 weight per cent of a wetting agent, from about 0.5 to about 5 weight per cent of a water dispersible bonding agent and from about 27 to about 74 weight per cent water. Metal articles are coated with the above composition under pressure to fill "pin holes". A 2-3 mil surface coating is then applied to inside and outside surfaces. A heated article is dipped into composition at ambient temperature after which the composition is cured in situ. A method of preparing the composition and the coated article per se are also disclosed and claimed herein.

12 Claims, 1 Drawing Figure

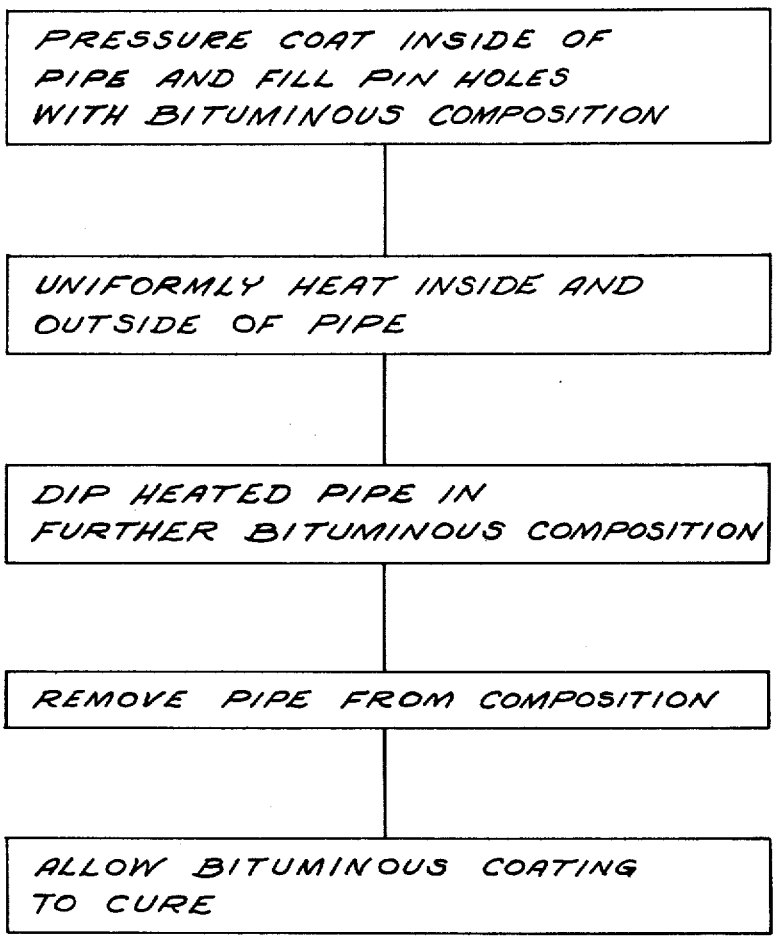

BITUMINOUS COATING SYSTEM AND ARTICLES PRODUCED THEREBY

This is a division, of application Ser. No. 323,443, filed Jan. 15, 1973.

BACKGROUND OF THE INVENTION

This invention relates to an improved bituminous composition suitable for coating metal articles, metal articles coated therewith, a method of producing the bituminous material and method for coating metal articles therewith.

A wide variety of materials have been heretofore employed to form protective coatings on metal substrates such as cast iron or steel pipes that are to be buried in the earth, usually for use in water or sewer lines. Successful coatings should be water impervious, prevent corrosion of the metal substrate, uniform in thickness and last but not least, attractive.

Prior techniques for producing proper bituminous coatings on metal substrates have been fraught with problems. Bituminous compositions have generally been employed with volatile solvent carriers and thus have presented extreme flammability hazards. Moreover, such solvent based compositions have been both expensive and difficult to maintain. Shelf life of the products is quite limited due to volatility of the solvent and normally the solvent volatilizes to give off a noxious vapor. Extreme handling precautions have thus been required for safety of plant and personnel not to mention the economics of same.

Application of the prior art bituminous composition has also been found to possess inherent disadvantages as is well evidenced by rejects in a general range of 20–40 percent of production. Cast iron pipes are pervious to water as produced, containing a large quantity of "pin holes". The pin holes must be substantially completely eliminated during coating or "leaks" result, where water seeps through the pin holes upon standing. Generally speaking, the prior art methods of application involve heating of the bituminous composition to and generally much above the melting point of the asphalt or other bituminous material and dipping, rolling or otherwise submerging a cold pipe therein. The high temperatures of the composition require substantial heat energy and renders the composition somewhat unstable. Moreover, the coating as applied is generally ununiform along the length of the pipe and does not sufficiently close the pin holes. Hence excess composition is utilized and poor joints or other fittings result from the lack of coating uniformity. Though the large percentage of rejects may be recycled through the process, starting with recasting of the pipe, great expense is incurred due to the lack of efficiency of the process.

The present invention substantially overcomes the problems of the prior art. Not only is the production efficiency tremendously enhanced, but working conditions surrounding the operation are significantly improved. For example, only steam evolves from the present process, thus eliminating any potential pollution, corrosion and health hazards that previously prevailed when organic solvent vapors evolved and pervaded the environs. Moreover, a superior product is produced, both from the standpoint of functionality and aesthetics and overall economics of the operation are improved.

Substantial prior art is directed to the technology of the present invention as exemplified by U.S. Pat. Nos. Re. 25,757 to Morse; 2,485,321 to Schiermeler; 2,628,173 to Fair, Jr.; 2,656,857 to Cavallier; 2,860,080 to Illman et al; 2,883,289 to Furey et al; 2,903,409 to Morse; 2,909,825 to Cummings; 2,932,579 to Westlund, Jr. et al; 3,313,635 to Wollek et al; 3,434,851 to Miller; 3,468,687 to Thomas; 3,497,371 to Chang; and 3,574,652 to Alexander et al. This prior art, however, neither teaches nor suggests the facets of the present invention.

SUMMARY OF THE INVENTION

It is an object of this invention to provide an improved bituminous coating composition.

Another object of the present invention is to provide a novel procedure for producing a bituminous coating composition.

Still another object of the present invention is to provide a novel method for coating metal substrates with a bituminous composition.

Yet another object of the present invention is to provide an improved metal substrate coated with a uniform bituminous composition to resist passage of water and corrosion and one which does not create air pollution.

The bituminous composition of the present invention generally comprises from about 25 to about 65 weight percent of a bituminous material, from about 0.5 to about 3 weight percent of a wetting agent for the bituminous material, from about 0.5 to about 5 weight percent of a bonding agent for the bituminous constituent and from about 27 to about 74 weight percent water.

Preparation of the bituminous composition generally involves addition of the bonding agent to water during agitation to realize an even and complete dispersion of bonding agent in the water. Water at ambient temperature is slowly heated to approximately 200°F. with agitation while the bonding agent is added. Agitation should produce a vortex in the mix of from about 4 to 5 inches. The mix is then cooked and agitated at the 200°F. temperature for a period of time sufficient to produce substantially complete dispersion of the bonding agent in the water. The mix is then cooled to a temperature in the range of about 20° to 140°F. and the wetting agent is added, followed by continued mixing for 5 to 10 minutes. The bituminous constituent is then slowly added during agitation after which the mix is agitated for an additional time period of approximately 20 minutes. The bituminous constituent begins to swell and substantial sudsing occurs in the vat. Agitation is stopped and the mix allowed to settle until the suds disappear.

Metal articles, such as cast iron pipe can be uniformly coated with the above described composition without substantial safety hazard. Generally the pipe is sealed at one end and composition is applied through an opposite end under a pressure of about 20 to 40 pounds per square inch; the pipe is uniformly heated along its length, both inside and outside to a temperature at approximately the melting point of the bituminous constituent and while at this temperature, dipped into a further bituminous composition, withdrawn and allowed to cool, during which time the bituminous constituent cures.

Utilizing the above bituminous composition and coating method, a coated metal product results having a coating of uniform thickness along its length, with substantial closure of "pin holes" in the pipe wall. The completed article will resist corrosion and exhibits a good aesthetic appearance.

BRIEF DESCRIPTION OF THE DRAWING

The FIGURE depicts a block diagram of a preferred coating process according to the present invention.

DESCRIPTION OF THE PREFERRED EMBODIMENTS

It has been found, in accordance with the present invention, that a bituminous composition comprising from about 25 to 65 weight percent of a bituminous material, 0.5 to 3 weight percent of a wetting agent, 0.5 to 5 weight percent of a bonding agent and 27 to 74 weight percent water is especially advantageous for coating metal structures which are to be buried in the earth, such as sewer or water pipes. This composition is essentially nonflammable, does not release pollutants into the air when the bituminous material is maintained at a temperature sufficient to provide an asphaltic material which will readily flow, reduces the number of rejected structures because of pin hole leaks and provides a substantially uniform and smooth coating surface which inhibits corrosion of the metal structure and is substantially impervious to water.

The bituminous constituent of the composition according to the present invention is intended to include normally solid naturally occurring asphalt, such as Trinidad, Bermudea, Cuban, gilsonite, grahamite, and gland pitch, steam and vacuum reduced asphalts, petroleum residues, cracking residues, oxidized and blown asphalts, crude oil containing asphalts, coal tars, pitches, and mixtures thereof, and additionally petroleum and bituminous resins. These materials are usually of a dark brown or black color and consist essentially of carbon and hydrogen with relatively little oxygen, nitrogen or sulfur. Among the suitable bituminous materials the melting point or point at which the material flows to provide a suitable coating varies. Hence, the temperatures utilized in the present process are subject to some variation, though the ones specifically referred to are most preferred.

Wetting agents utilized herein wet out the bituminous constituent and permit its combination in a water based system as opposed to a solvent based system. Further, cast iron pipe coated according to the present has a silica flour layer therearound that resulted from the casting of the pipe. The wetting agent thus further assists in enabling the coating composition to pass through the silica flour.

Among the wetting agents which are utilized in the present composition, the soaps are preferred. Soaps are defined herein as the metallic salts of higher molecular weight fatty acids, i.e., an aliphatic carboxylic acid containing from 8 to 26 carbon atoms. Such acids are derived from animal, vegetable and marine oil such as linseed, soya, tall, menhaden, anchovy, tuna, tung, oiticica, safflower, rapeseed and the like. Of a special utility are the alkali and alkaline earth metal salts of such fatty acids as caprylic, capric, lauric, myristic, palmitic, stearic, arachidic, lauroleic, myristoleic, palmitoleic, oleic, gadoleic, ricinoleic, linoleic, linolenic, elostearic, arachidonic, clupanodonic, and mixtures thereof. The soaps may be produced by the saponification of the corresponding fatty acid or may be derived from the fatty oil, which may be a mixture of one or more esters or fatty acids, e.g., linseed oil soap.

Another group of wetting agents which find utility in applicant's bituminous composition include organic substituted sulfonic acids and esters. The most useful of these compounds are substituted sulfonic acids and esters having from 8 to 26 carbon atoms, such as alkyl carboxylic sulfonic acids or sulfonates (e.g. dodecyl benzoic sulfonic acid), including metal salts thereof as well as alkane sulfonates or alkyl-aryl sulfonates, each having from 8 to 26 carbon atoms (e.g. dodecyl sulfonate or tetradecyl benzyl sulfonate).

The bituminous composition further contains from about 0.5 to 5 weight percent of a bonding agent. The bonding agent penetrates the bituminous constituent, preferably asphalt, causing it to swell in the composition, and further bonds the asphalt, etc. to the metal substrate. The bonding agent is a water dispersible, organic polymer, exemplified by the vinyl polymers which include, but are not limited to polyvinyl alcohol, polyvinyl chloride polystyrene, polyvinyl toluene and polyalphamethyl styrene.

Preparation of the bituminous composition is important since a water based composition results. The following procedure should therefore be followed. Water at ambient temperature is added to a vat and is slowly heated over a period of 20 to 60 minutes to a temperature in the range of about 170°F. to 210°F. Under constant agitation the bonding agent is slowly added, the agitation being sufficient to create a vortex in the liquid of about 4 to 5 inches. Heat and agitation are continued until the bonding agent is completely dispersed throughout the water, normally around 45 minutes, though much shorter periods have been experienced. The dispersion is then cooled to a temperature in the range of about 20° to 140°F. and the wetting agent is added, followed by continued agitation for a period of about 3 to 30 minutes to completely disperse same. The bituminous ingredient is next added during continued agitation.

After the bituminous ingredient is added, agitation is continued for approximately 20 minutes when the asphalt, etc. begins to swell and substantial sudsing occurs. After the bituminous ingredient is thoroughly dispersed in the composition, agitation is stopped and the suds permitted to settle. While it is not desirable to withdraw a sudsy composition from the vat, complete settling is not required. Instead, some of the composition may be withdrawn by gravity feed from the bottom of the vat and thereafter little by little until all the composition has been withdrawn. Generally, several vats are used simultaneously whereby they may be drained sequentially, thus avoiding any excess waiting period for settling.

Once the composition has been produced, it may be used immediately or stored, though during storing, air is continuously pumped through the composition to prevent any phase separation and thus maintain the composition in proper form for later use.

In heating and cooling the composition during preparation thereof, it is preferred that indirect means be utilized, e.g., coils through which a hot or cold medium is passed. Direct heating is preferably avoided since as good a distribution of the bonding agent in the water is not realized thereby. The composition is mixed continually from the time that the bonding agent is added to the water until the suds are allowed to settle. In mixing the bonding agent with the water and throughout the process, it is especially desirable to have sufficient agitation such that a vortex of from about 2 to 6 inches is formed and preferably about 4 to 5 inches. An indirect drive paddle type mixer is especially useful for this type of mixing. It is essential that the mixing temperature not exceed 210°F. since the boiling point of water is 212°F. An excessive loss of water would result at temperatures exceeding same. Moreover, at temperatures below about 170°F., poor distribution of the bonding agent in the water occurs. After adding and thoroughly dispersing the wetting agent, the asphaltic, etc. material is usually added in batches, e.g., 100 pounds at a time and mixing is continued for a period of from about 5 to 30 minutes after addition is complete.

Protective coatings are often needed if not required for metal substrates that are to be employed underground or exposed to severe conditions where general painting affords inadequate protection. Good examples of such substrates are cast iron pipes that are to be used to produce water lines, sewer lines, or the like. Many of these lines are deployed underground and to require suitable protective coatings to insure a long useful life for the item. Moreover, cast iron pipes are molded and exit the mold in a porous condition with a silica flour coating therearound. The silica flour is employed in the molding process to preserve the usefulness of the permanent molds. The bituminous composition as mentioned above provides a very excellent coating material for cast iron and the like. Very importantly, however, the substrate should be coated according to the following process to achieve the most beneficial results. While the following discussion is limited to pipes, it should be understood that pipes are examples only.

The Figure depicts in block diagram general steps of the process. As will be discussed later in more detail, the particular sequence of steps depicted is not firm, but may be changed, combined and the like. A preferred sequence is depicted, however, as discussed immediately hereinafter.

Metal pipe having silica flour thereon is first pressure coated on the inside, primarily to plug the large number of "pin holes" in the wall of the pipe. A plug is inserted into one end of the pipe and bituminous composition is supplied into an opposite end of the pipe under a pressure preferably of from about 20 to 60 pounds per square inch, though higher pressure may be employed if desired. The composition may be at ambient temperature and is forced into the pin holes by pressure within the pipe. This step is sometimes referred to as the "testing step".

The pipe is then removed from the inside coating apparatus and is uniformly heated both inside and outside along its length to a temperature only slightly above the metling point of the bituminous ingredient being employed, generally in the range of from about 160° to about 420°F., though a range of about 170°F. to about 210°F. is most preferred. Most preferably the pipe is heated to no more than 10° degrees above the melting point of the particular bituminous composition, the reason for which will be explained hereinafter. Heating of the pipe after the inside pressure coating drives off water from the composition and causes the asphalt, etc. to flow and substantially seal the pin holes. The composition is thus cured.

The heated pipe is then submerged in a further bituminous composition that may have the same or a different make-up. While the first composition is utilized mainly to fill the pin holes, the second composition is primarily the protective outer layer and also must thus take into consideration the final appearance of the pipe. The second composition may therefore have further ingredients beyond those of the first composition to give a good color, sheen, and the like. For example, the second composition may further contain pigments, organic solvents, emulsifying agents, and the like as will be illustrated hereinafter in the Examples.

Dipping of the heated pipe into the bituminous composition for the over-all coating of the pipe is a rapid operation, requiring less than one minute and preferably around 10 seconds. Time of contact between the pipe and the composition determines the thickness of the coating applied. Normally a coating thickness of 2 to 3 mils is desired. Moreover, a high production rate is also a factor for speed. The second bituminous composition is utilized at ambient temperature, though after repeated dippings, the temperature of the composition approaches the temperature of the pipe. Pipe surface temperature is sufficient to cause the bituminous material to flow. Material immediately adjacent the pipe approaches its melting point and provides the suitable coating. A temperature greatly exceeding the melting point of the asphalt, etc. will cause water in the composition to bubble, migrate or the like and will physically force the composition away from the pipe whereby coating efficiency is impaired. Hence, pipe temperature should be held close to the particular melting point.

After the removal of the coated pipe from the composition, the bituminous material immediately starts to cure. Water from the composition leaves as steam and the bituminous ingredient is bound to the pipe by the bonding agent. In certain circumstances, it may further be desirable to provide a further direct heat, indirect heat, infra-red heat or hot air source after the dip coating to accelerate evaporation of the water and consequent curing of the coating. In any event, subsequent to final curing of the coating the pipes are cooled and bundled, after which they are ready for shipment.

The above process has been defined as sequentially depicted on the Figure. It should be pointed out, however, that the procedure may be reversed, i.e., that the pressure coating of the inside of the pipe may follow the dip coating. Further, both operations may also be combined. Also as mentioned above the same or different bituminous compositions may be employed in the two operations.

The instant process substantially reduces the number of pipes rejected as leakers because of the pressure coating to fill pin holes, followed by the dip coating of the entire surfaces. Furthermore, the bituminous composition need not be maintained at a specific temperature. Instead, the metal structures are heated. Less process quality control problems are thus encountered. Additionally and very importantly, if the bituminous composition itself were heated, production of a uniform coating on the pipe would be much more critical. To obtain same, the temperature of the composition and the pipe must be kept substantially constant, and the pipe must be level in the coating vat, rotating at a substantially constant rpm.

The present bituminous compositions are much less dense and viscous than asphalt, more readily penetrate the silica flour on the pipe, adhere more readily to the pipe, and produce a more uniform, smoother coating. The composition of this invention wets the silica flour when some of the water leaves the composition and penetrates the silica flour. A brownish-blackish hue is imparted to the flour, whereby, in the event any coating is scraped away from the pipe, a white streak is not visible. To maintain a substantially uniform coating throughout the surface of the pipe and from pipe to pipe, it is extremely important that the pipe be heated to a substantially uniform temperature along its surface and that the temperature from pipe to pipe not vary significantly.

The invention may be more fully understood by reference to the following examples. All parts and percentages are by weight and all temperatures are expressed as degrees F., unless otherwise expressly noted.

EXAMPLE 1

Eight Hundred pounds of water and 20 pounds of polyvinyl alcohol (Elvanol 71-30G) were added to a large kettle having an indirect drive paddle type mixer therein. The mixer was driven at about 60 rpm to thoroughly mix the two components. Coils immersed in the mixture received steam therethrough and heated the mixture gradually to 200°F., over a period of about 30 minutes. The mixer provided sufficient agitation to form a vortex in the liquid about 4 to 5 inches in height. The composition was then cooked at about 200°F. for about 45 minutes during which time the polyvinyl alcohol was thoroughly dispersed throughout the water. Cold water was then poured through the coils and the dispersion cooled down to about 80°F. (approximate ambient temperature). Sixteen pounds of linseed oil soap was then added to the mixture and thoroughly dispersed by mixing for abour five minutes. Thereafter, four hundred pounds of ground asphalt (320 screen) having a melting point of about 220°F. was added in 100 pound increments during constant mixing. The overall composition was then further mixed for about 20 minutes after addition of the asphalt was completed. Heavy sudsing appeared at the top of the kettle, much like a detergent suds, and the asphalt particles showed evidence of swelling. After mixing, the bituminous composition in the kettle was allowed to sit for about 1 hour and 15 minutes. The majority of the suds had disappeared, and the composition was withdrawn from the bottom of the kettle by gravity feed. Final composition analysis showed about 65 percent water, 1.6 percent polyvinyl alcohol, 1.3 percent linseed oil soap and 32.5 percent asphalt.

EXAMPLE 2

A quantity of the bituminous composition of Example 1 at ambient temperature was placed in a first dip tank of sufficient size to accommodate a pipe as long as 20 feet and up to 12 inches in diameter. Cast iron pipes 10 feet long and 4 inches in diameter were conveyed to the first dip tank containing the bituminous composition and were dipped therein. A closure was fitted over one end of the pipes and the bituminous material was pumped into the other end of the pipes at a pressure of approximately 30 pounds per square inch. The bituminous material coated the inside of the pipes and later testing proved that substantial blockage of the pin holes was accomplished. The inside coated pipes were then conveyed through flames generated by natural gas burners directed at both ends of the pipe as well as the outer surface thereof. The temperature of both the inner and outer surfaces of the pipes was raised to about 220°F. (the melting point of the asphalt). The heated pipes were then immediately conveyed to a second dip tank containing unheated bituminous composition of Example 1. The heated pipes were dipped into the bituminous material for approximately 10 seconds and then removed therefrom. Coating on the pipes immediately started to set up or cure by evaporation of water after removal from the dip tank. The pipes were conveyed away from the dip tank and after about five minutes the coating had cured and the pipes were cool enough to handle. A substantially uniform coating of approximately 2 mils thickness was present along the inside and outside surfaces of the pipes. The coating had a glossy black finish and was not easily removed by scratching with a blunt instrument. Pressure testing of the coated pipes indicated a very low reject count due to leaks in the pipe walls.

EXAMPLE 3

Example 2 was repeated with the exception that the bituminous composition in the second tank comprised 100 parts of Vinsol, an insoluble natural resin derived from pinewood, manufactured by Hercules Inc., Wilmington, Delaware; 100 parts of ground asphalt; 100 parts of toluene; 15 parts of Emulphor VN 430, a non-ionic emulsifier, produced by G.A.F. Corporation, Chemical Division, New York, New York; 315 parts of water; 5 parts of sodium hydroxide; 2 parts of graphite black pigment; and 4 parts of Elvanol 71-30G, polyvinyl alcohol, produced by E. I. duPont deNemours Company, Wilmington, Delaware. The composition was produced according to the techniques set forth for the composition of Example 1. After the dip coating and curing thereof, a uniform coating approximately 2 mils thick was present along the inside and outside surfaces of the pipes. Like the pipes of Example 2, the coating was tested under pressure and results indicated good water imperviousness of the pipes. The coating exhibited a black, glazed appearance.

The second composition of Example 3 is designed to provide a good surface coating while the first composition (Example 1) is designed primarily to stop leaks. The combination of the two provides a good overall pipe coating that represents a substantial savings to the foundries, reduces fire and health hazards and reduces pollution.

More specifically the surface coating composition preferably comprises from about 5 to about 20 weight percent of an insoluble natural resin, about 5 to about 25 weight percent of a bituminous ingredient, about 5 to about 20 weight percent of an organic solvent, from about 1 to about 10 weight percent of an emulsifier, about 25 to about 75 weight percent water, about 0.1 to about 5 weight percent of an inorganic base, about 0.1 to about 5 weight percent of a water dispersible polymeric bonding agent.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A process for coating porous metal structures with a water based bituminous composition comprising the steps of:
   a. applying said composition onto said structure to cover the exposed surfaces thereof, at least certain of said composition being applied under a pressure in the range of about 20 to about 40 pounds per square inch against said structure to force composition into any porosities of said structure to substantially completely block same; and
   b. uniformly applying heat to said structure exposed surfaces to evaporate water therefrom and thereby cure said bituminous coating, said heat being approximately at the melting point of the bituminous ingredient of said composition.

2. The process as defined in claim 1 wherein composition is first applied under pressure, the structure is then uniformly heated to approximately the melting point of the bituminous ingredient, the heated structure is dipped into said composition, and the composition cures after removal from said composition.

3. The process as defined in claim 2 wherein the structure is further heated after dipping into the composition.

4. The process as defined in claim 1 wherein the structure is a cast pipe.

5. A process for coating a cast pipe with a water based bituminous coating comprising the steps of:
   a. closing one end of said pipe and forcing said composition into an opposite end thereof at a pressure of about 20 to about 60 pounds per square inch;
   b. opening said pipe;
   c. heating inside and outside surfaces of said pipe, uniformly along its length to a temperature approximately at the melting point of a bituminous ingredient in said composition;
   d. dipping said heated pipe into a second bituminous composition, heat to said composition being provided from said pipe only;
   e. removing said pipe from said composition; and
   f. curing said composition by the removal of water therefrom.

6. The process of claim 5 wherein said pipe is heated to approximately 200°F. and the pressure applied bituminous composition comprises 25 to about 65 weight percent of a bituminous ingredient, about 0.5 to about 3 weight percent of a wetting agent, about 0.5 to 5 weight percent of a water dispersible polymeric bonding agent and from about 27 to about 74 weight water.

7. The process of claim 5 wherein both of the compositions comprise about 25 to about 65 weight percent of a bituminous ingredient, about 0.5 to 3 weight percent of a wetting agent, about 0.5 to about 5 weight percent of a water dispersible polymeric bonding agent and from about 27 to about 74 weight percent water.

8. The process of claim 6 wherein the second bituminous composition comprises from about 5 to about 20 weight percent of an insoluble natural resin, about 5 to about 25 weight percent of a bituminous ingredient, about 5 to about 20 weight percent of an organic solvent, from about 1 to about 10 weight percent of an emulsifier, about 25 to about 75 weight percent water, about 0.1 to about 5 weight percent of an inorganic base, about 0.1 to about 5 weight percent of a pigment and about 0.1 to about 5 weight percent of a water dispersible polymeric bonding agent.

9. A porous metal structure, said structure having the porosities thereof substantially completely filled with a bituminous material, said structure further having a uniform coating of bituminous material on all exposed surfaces thereof, said material being bound to said structure by a polymeric bonding agent.

10. The metal structure of claim 9 wherein the structure is a cast pipe.

11. The metal structure of claim 10 wherein the coating is 2 to 3 mils thick.

12. The metal structure of claim 11 wherein the bituminous material is asphalt.

* * * * *